United States Patent Office 2,890,040
Patented June 9, 1959

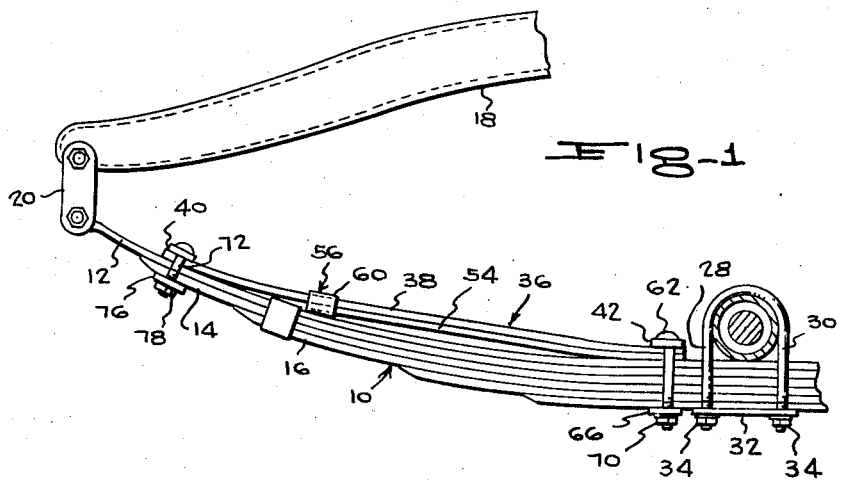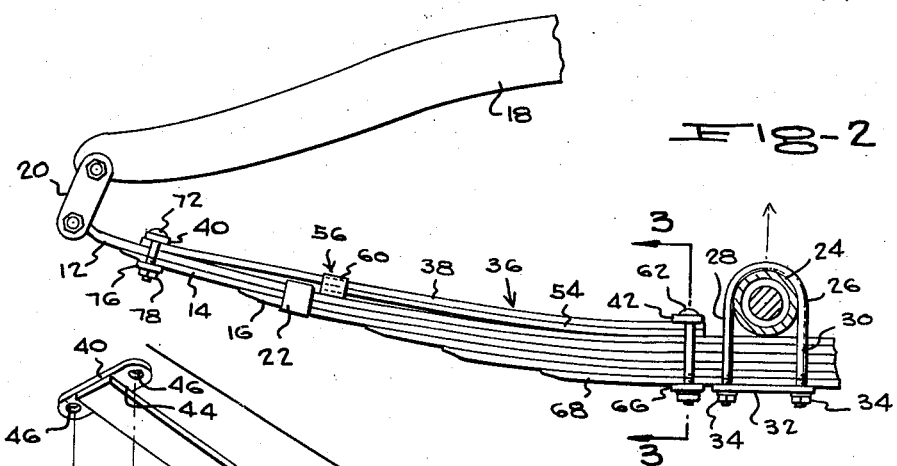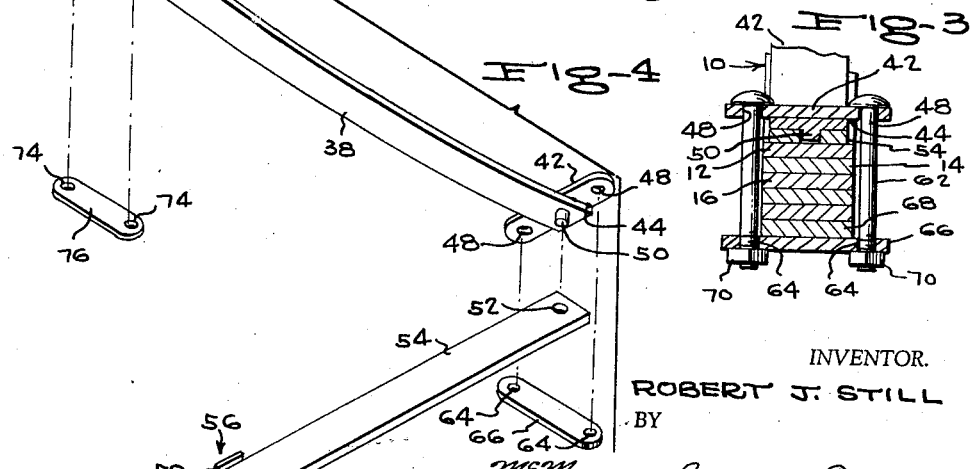

2,890,040

AUXILIARY VEHICLE SPRING

Robert J. Still, Shreveport, La.

Application July 26, 1957, Serial No. 674,424

3 Claims. (Cl. 267—45)

This invention relates to improvements in vehicle suspension devices and, more specifically, the invention pertains to improvements in suspension type devices of the leaf spring type.

One of the primary objects of this invention is to provide an auxiliary or booster spring for leaf spring suspended vehicles of conventional design, construction and installation.

Another object of this invention is to provide an auxiliary or booster spring for conventional half-elliptical leaf spring type suspensions for vehicles, the auxiliary or booster spring being utilized when the vehicle is to be loaded beyond the normal load carrying capacity of the leaf springs.

A further object of this invention is to provide an auxiliary or booster spring device for vehicles employing leaf spring suspension means, the device comprising an attachment which may be quickly and easily installed.

This invention contemplates, as a still further object thereof, the provision of an attachment of the type generally described above, the attachment being non-complex in construction and assembly, inexpensive to manufacture, and durable in use.

Other and further objects and advantages of the present invention will become more evident from a consideration of the following specification when read in the light of the annexed drawing, in which:

Figure 1 is a side elevational view of a conventional leaf spring suspension means together with the auxiliary or booster spring constructed in accordance with the teachings of this invention, the view illustrating the several suspension elements in their respective no load positions;

Figure 2 is a side elevational view of the spring suspension means illustrated in Figure 1, the several elements thereof being shown under load conditions;

Figure 3 is an enlarged, detailed, cross-sectional view taken substantially on the vertical plane of line 3—3 of Figure 2, looking in the direction of the arrows; and Figure 4 is an exploded perspective view of the auxiliary spring or booster spring constructed in accordance with this invention.

Referring now more specifically to the drawing, reference numeral 10 designates, in general, a conventional spring of the half-elliptical leaf type and includes the leaf springs 12, 14 and 16, to which further reference will be made below. The ends of the spring suspension 10 are connected to the longitudinally extending side frame members 18 of the vehicle by a conventional connector means 20. At longitudinally spaced intervals clamps 22 extend around the leaf springs 12, 14 and 16 in the usual manner.

The suspension means 10 is connected, intermediate its length, to the vehicle's axle housing 24 by means of a pair of inverted substantially U-shaped bolts 26 (only one being shown) which extend over the axle housing 24 and depend therefrom on opposite sides of the spring means 10. The lower ends of the arms 28, 30 of the U-shaped bolts 26 are threaded and extend through a central clamping plate 32. Nuts 34, when tightened, clamp the spring device means 10 to the axle housing 24.

All of the foregoing construction is conventional and considered, per se, forms no part of this invention.

Reference numeral 36 indicates, in general, the attachment to which the present invention is directly addressed. As is illustrated in the figures, the attachment 36 is seen to comprise an elongated arcuately shaped element 38 formed of spring steel material. Substantially rectangular clamping plates 40, 42 extend, respectively, transversely across the opposed ends of the element 38 and are fixedly secured thereto as by welding 44. The clamping plate 40 is formed with a transversely extending opening 46 adjacent each of its respective ends, and similar openings 48 extend, respectively, through the clamping plate 42 adjacent its opposed ends.

A substantially cylindrical boss 50 projects laterally from the element 38 adjacent that end thereof on which is secured the clamping plate 42. The boss 50 is adapted to be received within an opening 52 formed in one end of an elongated substantially rectangular element 54. A substantially U-shaped member 56 is rigidly connected to the other end of the rectangular element 54 and, as is seen in the drawing, the arms 58, 60 of the U-shaped member 56 project vertically above the rectangular element 54.

The arcuate element 38 is superposd on the rectangular element 54 with a portion of the former slidably received, as will be explained below, between the arms 58, 60 which serve as guide means therefor. The elements 38, 54 are now, in turn, superposed over the main leaf spring 12 with the element 54 directly engaging the leaf spring 12. Bolts 62 extend downwardly through the openings 48 formed in the clamping plate 42 on opposite sides of the suspension means 10 (see Figure 3) and extend through openings 64 formed adjacent each end of a substantially rectangular clamping plate 66. The plate 66 bears directly against the lowermost reinforcing leaf spring 68 and is held thereagainst by nuts 70.

The longitudinal dimension of the element 38 is greater than its associated element 54, and the outer end of the former is slidably connected on the main leaf spring 12 by means of bolts 72 which extend through the openings 46 formed in the clamping plate 40 and depend therefrom to project through openings 74 formed adjacent each of the respective ends of a substantially rectangular clamping plate 76, the latter bearing against the reinforcing leaf spring member 14. The assembly is retained by nuts 78.

The above described suspension means is especially designed for application to the rear springs of automobiles which are to be equipped with trailers. Knowing the overload which will be applied to the rear springs of the car, the auxiliary booster spring device of this invention may be quickly installed to provide for the overload without danger of springs breaking. However, while this particular example of use has been set forth in some detail, the same is not to be considered as a limitation of the invention for it may be installed in a variety of vehicles, such as trucks, trailers, etc.

From the foregoing description, the operation of the auxiliary spring means 36 seems to be manifest. With the vehicle under normal or no load conditions, the component parts of the device 36 assume the positions illustrated in Figure 1. However, with an overload present, the component parts of the device 36 move to the positions shown in Figure 2. In comparing Figures 1 and 2, it should be noted that in Figure 2 the leaves of the suspension device 10 tend to lengthen the straight line distance between their respective ends. As this movement takes place, the straight line distance between the ends of the arcuate element 38 also increases and the outer end of the element 38 slides on the main leaf spring 12 thereby changing the point of the application of its tension or lift thereon. Thus the moment the force is increased the overload may be safely accommodated.

Having described and illustrated one embodiment of this invention in detail, it will be understood that the same is offered merely by way of example, and that this invention is to be limited only by the scope of the appended claims.

What is claimed is:

1. An auxiliary or booster spring device for accommodating overloads developed by vehicles utilizing half-elliptical spring suspension means for supporting the vehicle frame and including a main leaf spring pivotally connected to said frame, said auxiliary device comprising an elongated substantially rectangular element superposed on said main leaf spring and having an opening extending transversely therethrough adjacent an end thereof, an elongated arcuate spring element superposed on said rectangular element, said arcuate element having a cylindrical boss projecting from an end thereof for connection with said opening, means connecting said ends of said rectangular and arcuate elements to said half-elliptical spring suspension means substantially centrally thereof, means slidably connecting the other end of said arcuate element to said main leaf spring adjacent its said connection with said frame, and a substantially U-shaped member fixedly secured to the other end of said rectangular element, said U-shaped member having a pair of arms slidably receiving a portion of said arcuate element therebetween.

2. An auxiliary or booster spring device for accommodating overloads developed by vehicles utilizing half-elliptical spring suspension means for supporting the vehicle frame and including a main leaf spring pivotally connected to said frame, said auxiliary device comprising an elongated substantially rectangular element superposed on said main leaf spring, an elongated arcuate spring element superposed on said rectangular element, means interconnecting one pair of adjacent ends of said rectangular element and said arcuate spring element, means connecting said interconnected ends of said rectangular and arcuate spring elements to said half-elliptical spring suspension means substantially centrally thereof, means connected to the other end of said arcuate element and engaging around said main leaf spring adjacent its said connection with said frame to permit relative axial movement of said main leaf suspension with respect to said arcuate element, and a substantially U-shaped member fixedly secured to the other end of said rectangular element, said U-shaped member having a pair of arms slidably receiving a portion of said arcuate element therebetween.

3. An auxiliary or booster spring device for accommodating overloads developed by vehicles utilizing half-elliptical spring suspension means for supporting the vehicle frame and including a main leaf spring pivotally connected to said frame, said auxiliary device comprising an elongated substantially rectangular element superposed on said main leaf spring, an elongated arcuate spring element superposed on said rectangular element and extending beyond the outer terminal end thereof, means interconnecting one pair of adjacent ends of said rectangular element and said arcuate spring element, means connecting said interconnected ends of said rectangular and arcuate spring element to said half-elliptical spring suspension means substantially centrally thereof, means slidably connecting the other end of said arcuate element on said main leaf spring adjacent its said connection with said frame, said last named means comprising a substantially rectangular transverse clamping plate fixedly secured to said other end of said arcuate element and slidably engaging said main leaf spring, said clamping plate having an opening formed in each of its outer ends, a second substantially rectangular clamping plate slidably engaging the opposed side of said half-elliptical spring, said second clamping plate having an opening formed in each of its outer ends, bolts extending through said apertures in said plates, said bolts having nuts thereon to secure said second plate in a fixed position relative to said first plate whereby said slidable connection is accomplished, a substantially U-shaped member fixedly secured to the other end of said rectangular element, and said U-shaped member having a pair of arms slidably receiving a portion of said arcuate element therebetween.

References Cited in the file of this patent

UNITED STATES PATENTS

| | | |
|---|---|---|
| 1,099,539 | De LaMonte | June 9, 1914 |
| 1,381,255 | Tisman | June 14, 1921 |
| 1,413,451 | Arnot | Apr. 18, 1922 |
| 1,419,098 | Arnot | June 6, 1922 |
| 1,621,962 | Stringer | Mar. 22, 1927 |
| 1,987,189 | Geyer | Jan. 8, 1935 |
| 2,205,086 | Dell | June 18, 1940 |